3,000,839
POLY-(AROMATIC ETHER) COMPOSITIONS AND
METHOD OF MAKING SAME
Earl H. Rosenbrock, Auburn, and James D. Doedens, Midland, Mich., assignors to The Dow Chemical Company, Midland, Mich., a corporation of Delaware
No Drawing. Filed Sept. 28, 1959, Ser. No. 842,608
4 Claims. (Cl. 260—2.5)

This invention concerns the preparation of polymeric aromatic ethers, condensation products of polyhalomethylated aromatic ethers having more than one chloromethyl or bromomethyl group per aromatic ether molecule. More particularly it concerns foamed condensation polymers of polyhalomethylated diphenyl oxides, prepared by using a ferrous or ferric phosphate or mixture thereof both as a polymerization catalyst and as a foam modifier.

The preparation of foamed condensation polymers of polyhalomethyl diphenyl oxides, PHMDPOs, by which designation is included chloromethyl and bromomethyl diphenyl oxides (CMDPO and BMPDO, respectively) containing more than one halomethyl group per aromatic ether molecule, such as dihalomethylated diphenyl oxide, trihalomethylated diphenyl oxide and tetrahalomethylated diphenyl oxide and their methyl substituted homologs, hereinafter designated as DCMDPO, Tri-CMDPO, Tet-CMDPO, DBMDPO, Tri-BMDPO, Tet-BMDPO and commercial or technical grade mixtures thereof which may contain small amounts of mono-CMDPO or mono-BMDPO and unreacted diphenyl oxide and wherein the chloromethyl or bromomethyl substituents are in the ortho and/or para positions with respect to the ether oxygen, have usually been carried out by heating them in the presence of a Friedel-Crafts catalyst, e.g., zinc chloride, ferric chloride, aluminum chloride, boron fluoride, etc., as described in U.S. patent application Serial No. 530,891, filed August 26, 1955, now U.S. Patent 2,911,380.

In the preparation of such foamed condensation products wherein HMDPO having more than one chloromethyl or bromomethyl group per molecule is heated to a temperature sufficient to cause reaction with foaming due to evolution of hydrogen chloride or hydrogen bromide in the presence of a Friedel-Crafts catalyst, difficulty has been experienced in uniformly dispersing such catalysts because of their insolubility so as to get a relatively homogeneous reaction mixture whereby a uniformly foamed reaction product can be obtained. Consequently, with such prior art catalyzed reaction mixtures it has been necessary to use extreme care to insure obtaining completely thermoset products which do not shrink thereafter. This has meant using prolonged agitation at an elevated temperature, still without complete satisfaction. Also, prior art compositions are too fluid, in many instances, and flow out unduly instead of foaming straight up.

In accordance with this invention, it has been discovered that a small amount of anhydrous ferrous or ferric phosphate or their mixture, e.g., from about ⅛ to about 2 weight percent, HMDPO basis, can be uniformly dispersed therein and at least partially dissolved by simple mixing to act as a decomposition catalyst for the evolution of hydrogen halide at a relatively low reaction temperature between about 50° and 150° C. Thereby substantially uniformly foamed reaction products are obtained which are completely thermoset and do not shrink thereafter. The ferrous and ferric phosphate also have a viscosity increasing effect during the condensation reaction so that foaming is obtained with substantial minimization of undesirable running or flowing out. Since the catalyst is readily dispersed and is at least partially soluble in the reaction mixture, depending upon the amount used, prolonged agitation and heating to promote adequate dispersion are both avoided.

The following examples are in illustration and not in limitation of the invention. Parts and percentages therein are by weight.

EXAMPLE 1

A 4" x 6" pyrex glass plate marked with a horizontal line across the top was tilted at 30° to the horizontal in the laboratory oven and heated to the desired temperature. PHMDPOs with various additives were then tested by putting two drops of the formulation on the top line and the distance of run down before cure was measured, as follows.

The advantages gained with ferrous and ferric phosphate are ease of dispersion when mixed with HMDPOs and a lower cure temperature with less run. In all cases, the products thereby obtained are completely thermoset, relatively uniformly foamed condensation polymers. Results follow.

Table I
REDUCTION IN FLOW AT DIFFERENT TEMPERATURES

| Material | Additive | Percent Conc. | Run in Inches at— | | |
|---|---|---|---|---|---|
| | | | 100° C. | 130° C. | 150° C. |
| CMDPO (17.5% Cl).[1] | Ferrous phosphate. | 1 | 5 | 4 | 3 |
| Do | do | 0.5 | 5.5 | 4 | 3 |
| Do | do | 0.25 | 6 | 5.25 | 4 |
| Do | do | 0.125 | 7 | 6.5 | 5.5 |
| Do | none | | (²) | (²) | (²) |

[1] Diphenyl oxide.

| | Mole percent |
|---|---|
| o-CMDPO | 17.3 |
| p-CMDPO | 5.3 |
| o,p-DCMDPO | 42.9 |
| p,p'-DCMDPO | 10.8 |
| Tri-CMDPO | 20.6 |
| Tet-CMDPO | 2.3 |

[2] Thermoplastic shrank. 0.5–1.0

EXAMPLE 2

The foam character of several HMDPOs was studied with various additives at 100° and at 150° C. The formulations were placed in beakers and heated in a laboratory oven at the given temperatures. After a time sufficient for a complete cure, the density and type foam were characterized. Results follow.

Table II

FOAM CHARACTER 100° C.

| Material | Catalyst | Percent Conc. | Temp., °C. | Time, Min. | Density, lb./cu. ft. | Properties |
|---|---|---|---|---|---|---|
| CMDPO (17.5% Cl). | Ferrous phosphate. | 1 | 100 | 3 | 0.75 | Large pore size foam, few blow holes, thermoset no shrinkage. |
| Do | ZnCl₂ | 1 | 100 | 5 | 1.5 | Fine pore size thermoplastic, shrank. |
| Do | none | | 100 | 25 | 2.5 | Very poor foam, shrank thermoplastic. |

FOAM CHARACTER 150° C.

| Material | Catalyst | Percent Conc. | Temp. °C. | Foam Density lb./cu. ft. | Foam Type |
|---|---|---|---|---|---|
| CMDPO (17.5% Cl) | Ferrous phosphate. | 1 | 150 | 0.67 | Large uniform pores few blow holes, thermoset, no shrinkage. |
| Do | do | 0.5 | 150 | 0.73 | Do. |
| Do | do | 0.25 | 150 | 1.08 | Do. |
| Do | none | | 150 | 2.25 | Small pore foam, few large blow holes, thermoplastic, shrank. |
| CMDPO (18.5% Cl) | Ferrous phosphate. | 1 | 150 | 2.3 | Small pore foam, few large blow holes, thermoset, no shrinkage. |
| Do | none | | 150 | 4.5 | Very poor foam, large blow holes, thermoplastic shrank. |
| CMDPO (23.5% Cl).[1] | Ferrous phosphate. | | 150 | 8.1 | Heavy dense foam, thermoset no shrinkage. |
| Do | none | | 150 | 16.0 | Large blow holes, no foam, thermoplastic. |

|  | Mole percent |
|---|---|
| [1] o-CMDPO | 0.5 |
| p-CMDPO | 4.7 |
| o,p-DCMDPO | 35.4 |
| p,p'-DCMDPO | 37.7 |
| tri-CMDPO | 21.1 |
| tetra-CMDPO | 0.5–1.0 |

EXAMPLE 3

Ferrous phosphate as a catalyst and modifier of foams prepared from poly-CMDPOs was compared with zinc chloride at 70° C., as follows:

FOAM CHARACTER 70° C.

| Material | Catalyst | Percent Conc. | Temp., °C. | Time, Min. | Density lb./cu. ft. | Properties |
|---|---|---|---|---|---|---|
| CMDPO (17.5% Cl). | Ferrous phosphate. | 1 | 70 | 6 | 2.4 | Large pore size foam with few blowholes, thermoset, no shrinkage. |
| Do | ZnCl₂ | 1 | 70 | 30 | | Did not polymerize. |
| CMDPO (23.5% Cl). | Ferrous phosphate. | 1 | 70 | 4 | 3.8 | Large pore size, heavy cell walls with few blowholes, thermoset, no shrinkage. |
| Do | ZnCl₂ | 1 | 70 | 30 | | Did not polymerize. |
| CMDPO (17.5% Cl) | none | | 70 | 60 | | Do. |
| CMDPO (23.5% Cl) | none | | 70 | 60 | | Do. |

EXAMPLE 4

Ferric phosphate was dispersed in CMDPO (23.5% Cl) and foamed at 75° C. for ca. one minute with the following results.

| Percent FePO$_4$: | Properties |
|---|---|
| 0.5 | Fine pore size foam, few blowholes thermoset, no shrinkage. |
| 1.0 | Do. |
| 1.5 | Do. |

What is claimed is:

1. A method for making a foamed condensation product by heating at a temperature between about 50° and 150° C. for a time sufficient to evolve hydrogen halide and to form a foamed, resinous, condensation product, a member of the group consisting of poly(halomethyl) diphenyl oxides having more than 1 and up to 4 halomethyl substituents of the group consisting of chloromethyl and bromomethyl per diphenyl oxide unit and mixtures thereof containing from about 1/8 to about 2 weight percent of one of the group consisting of ferrous phosphate, ferric phosphate and mixtures thereof dispersed therein.

2. The method of claim 1, wherein the halomethyl substituents are chloromethyl groups.

3. A composition for making foamed condensation products the essential ingredients of which consist of a member of the group of poly(halomethyl) diphenyl oxides having more than 1 and up to 4 halomethyl substituents of the group consisting of chloromethyl and bromoethyl per diphenyl oxide unit and mixtures thereof and about 1/2 to about 2 weight percent of one of the group consisting of ferrous phosphate, ferric phosphate and mixtures thereof dispersed therein.

4. The composition of claim 3, wherein the halomethyl substituents are chloromethyl groups.

References Cited in the file of this patent

UNITED STATES PATENTS 2,911,380     Doedens     Nov. 3, 1959